United States Patent
Wang et al.

(10) Patent No.: US 11,298,758 B2
(45) Date of Patent: Apr. 12, 2022

(54) CUTTING BLADE HAVING A PLURALITY OF DIFFERENT COATINGS ON SURFACES THEREOF

(71) Applicant: ZHUZHOU CEMENTED CARBIDE CUTTING TOOLS CO., LTD, Hunan (CN)

(72) Inventors: Shequan Wang, Hunan (CN); Aisheng Jiang, Hunan (CN); Lan Ni, Hunan (CN); Ping Li, Hunan (CN); Min Liu, Hunan (CN)

(73) Assignee: ZHUZHOU CEMENTED CARBIDE CUTTING TOOLS CO., LTD, Hunan (CN)

( * ) Notice: Subject to any disclaimer, the term of this patent is extended or adjusted under 35 U.S.C. 154(b) by 162 days.

(21) Appl. No.: 16/644,506

(22) PCT Filed: Dec. 25, 2017

(86) PCT No.: PCT/CN2017/118303
§ 371 (c)(1),
(2) Date: Mar. 5, 2020

(87) PCT Pub. No.: WO2019/047425
PCT Pub. Date: Mar. 14, 2019

(65) Prior Publication Data
US 2020/0282479 A1 Sep. 10, 2020

(30) Foreign Application Priority Data
Sep. 7, 2017 (CN) .......................... 201710800562.8

(51) Int. Cl.
*B23B 27/14* (2006.01)
*B23C 5/20* (2006.01)
*B23C 5/22* (2006.01)

(52) U.S. Cl.
CPC ............ *B23C 5/207* (2013.01); *B23C 5/2221* (2013.01); *B23B 27/14* (2013.01);
(Continued)

(58) Field of Classification Search
CPC .......... B23B 2228/10; B23B 2228/105; B23B 27/148; B23B 27/14; B23B 2200/321; B23C 2228/10; B23C 5/207; B23C 5/202
See application file for complete search history.

(56) References Cited

U.S. PATENT DOCUMENTS

| | | | | |
|---|---|---|---|---|
| 4,159,884 A | * | 7/1979 | Schott | ................... B23B 27/143 407/113 |
| 4,698,070 A | * | 10/1987 | Ohno | ................... B23B 27/146 51/307 |
| 8,839,497 B2 | | 9/2014 | Shin | |

FOREIGN PATENT DOCUMENTS

| | | |
|---|---|---|
| CN | 105269010 | 1/2016 |
| CN | 105506580 | 4/2016 |

(Continued)

OTHER PUBLICATIONS

"International Search Report (Form PCT/ISA/210) of PCT/CN2017/118303", dated Jun. 1, 2018, with English translation thereof, pp. 1-4.

*Primary Examiner* — Alan Snyder
(74) *Attorney, Agent, or Firm* — JCIP Global Inc.

(57) ABSTRACT

A cutting blade having a plurality of different coatings on surfaces thereof, including an upper surface, a lower surface, and a side surface connecting the upper surface and the lower surface, wherein the upper surface intersects the side surface to form at least one cutting edge unit, the cutting edge unit includes a main cutting edge and a secondary cutting edge, the upper surface includes at least one set of cutting planes, the cutting planes include a main cutting surface and a secondary cutting surface, the main cutting
(Continued)

surface intersects the side surface to form the main cutting edge, the secondary cutting surface intersects the side surface to form the secondary cutting edge, a main coating is provided on the main cutting surface, a secondary coating is provided on the secondary cutting surface, and the main coating and the secondary coating are independent from each other.

20 Claims, 5 Drawing Sheets

(52) U.S. Cl.
CPC .. *B23C 2200/125* (2013.01); *B23C 2200/205* (2013.01); *B23C 2200/208* (2013.01)

(56) References Cited

FOREIGN PATENT DOCUMENTS

| | | |
|---|---|---|
| CN | 107570772 | 1/2018 |
| JP | 2005335040 | 12/2005 |
| WO | 2006023222 | 3/2006 |

* cited by examiner

CUTTING BLADE HAVING A PLURALITY OF DIFFERENT COATINGS ON SURFACES THEREOF

CROSS-REFERENCE TO RELATED APPLICATION

This application is a 371 of international application of PCT application serial no. PCT/CN2017/118303, filed on Dec. 25, 2017, which claims the priority benefit of China application no. 201710800562.8, filed on Sep. 7, 2017. The entirety of each of the above mentioned patent applications is hereby incorporated by reference herein and made a part of this specification.

BACKGROUND

Technical Field

The present invention relates to a metal cutting blade, in particular to a cutting blade having a plurality of different coatings on surfaces thereof.

Description of Related Art

A substrate of a cutting blade is generally made of hard alloy with a good intensity to ensure cutting performance in cutting. It has been found in the industry that the blade made of pure hard alloy can be only applied when a cutting speed is not high due to high friction and easiness to produce built-up edges in cutting, and the service life thereof is short. The surfaces of the cutting blade feature high rigidity, high wear resistance, high heat resistance, low friction coefficient and effectiveness to eliminate built-up edges by means of applying one or more layers of refractory hard compounds, such as carbides, nitrides and oxides, and allows the cutting speed of the cutting blade to be improved by 20%-70%, thus greatly improving the cutting performance and service life of the cutting blade. With rapid development of the metal cutting industry, to fully improve the application ability of the cutting blade in some specific processing fields, the shapes of all cutting edges in the cutting unit are not completely identical and the cutting conditions of all cutting edges are different. A completely identical surface coating applied to the surfaces of the cutting blade will cause mismatching of service life of all cutting edges in the cutting unit even if the surface coating is simply produced; furthermore, the cutting unit will be scrapped due to damage of a certain cutting edge in the cutting unit in the course of cutting, thus causing unsatisfactory cutting life.

SUMMARY

The aim of present invention is to overcome the deficiencies of prior art and to provide a cutting blade having a plurality of different coatings on surfaces thereof that can optimize performances of all cutting edges, enable the service life of all cutting edges to be identical, improve the overall service life, and reduce the replacement rate. In order to solve the above technical problems, the present invention adopts the following technical solution:

A cutting blade having a plurality of different coatings on surfaces thereof, comprising an upper surface, a lower surface, and a side surface connecting the upper surface and the lower surface; the upper surface intersects the side surface to form at least one cutting edge unit, and the cutting edge unit comprises a main cutting edge and a secondary cutting edge; the upper surface comprises at least one set of cutting planes, and the cutting planes comprise a main cutting surface and a secondary cutting surface, the main cutting surface intersects the side surface to form the main cutting edge, and the secondary cutting surface intersects the side surface to form the secondary cutting edge; the main cutting surface is provided with a main coating, and the secondary cutting surface is provided thereon with a secondary coating, and the main coating and the secondary coating are independent from each other.

As further improvement of the above technical solution:

An angular cutting surface is provided between the main cutting surface and the secondary cutting surface, the angular cutting surface intersects the side surface to form an angular cutting edge, the main cutting edge smoothly connects the secondary cutting edge through the angular cutting edge, and a cutting edge unit is constituted by the main cutting edge, the secondary cutting edge and the angular cutting edge.

The angular cutting surface has an angular coating, the angular coating is the same as the main coating, or the angular coating is the same as the secondary coating, or the angular coating consists of the main coating and the secondary coating, or the angular coating differs from the main coating and the secondary coating.

The upper surface comprises two sets of cutting planes, the main cutting surface in each set of cutting planes has the main coating, the secondary cutting surface has the secondary coating, and one cutting edge unit is provided between the main cutting surface and the secondary cutting surface in each set of cutting planes; two cutting edge units are formed in total.

The main coating is a TiAlN coating, and the secondary coating is an $Al_2O_3$ coating.

The upper surface comprises two sets of cutting planes, the main cutting surface in each set of cutting planes has the main coating, the secondary cutting surface has the secondary coating, and one cutting edge unit is provided between the main cutting surface and the secondary cutting surface in each set of cutting planes; the cutting edge unit is provided between the main cutting surface in one set of cutting planes and the secondary cutting surface in the other set of cutting planes, and four cutting edge units are formed in total.

The main cutting edge is a continuous cutting edge, and the secondary cutting edge is an intermittent cutting edge.

The main coating is a TiN coating, and the secondary coating is a TiAlN coating.

The upper surface further comprises an upper middle surface, and the upper middle surface has an upper middle coating.

The lower surface and the upper surface are identical in structure.

Compared with the prior art, the present invention has the following advantages:

According to the cutting blade having a plurality of different coatings on surfaces thereof of the present invention, the cutting edges in the cutting edge unit and coatings of the corresponding surfaces thereof can be separately designed to maximally improve the cutting performances of all cutting edges based on different cutting edges in single cutting edge unit of the cutting blade and varied trough structures and cutting conditions thereof, thereby improving cutting efficiency and cutting life. Meanwhile, by means of designing specific surface coatings for all cutting edges in the cutting edge unit and surfaces thereof, even if the cutting conditions of all cutting edges are different, the varied coatings can be applied to optimizing performances of all cutting edges in the cutting unit, so as to allow the service life of all cutting edges in the cutting unit to be identical, and to avoid, for instance, failure of the entire cutting unit caused by damage of parts of cutting edges in single cutting unit of the ordinary cutting blade; the cost performance of the cutting blade has obvious advantages compared with the ordinary cutting blade when the blade inventory and consumption of hard alloy materials are greatly reduced, and the replacement rate of the cutting blade is reduced.

CALLOUTS 1. cutting plane; 2. upper surface; 21. main cutting surface; 211. main coating; 22. secondary cutting surface; 221. secondary coating; 23. angular cutting surface; 231. angular coating; 24. upper middle surface; 241. upper middle coating; 3. lower surface; 4. side surface; 5. cutting edge unit; 51. main cutting edge; 52. secondary cutting edge; 53. angular cutting edge.

DESCRIPTION OF THE EMBODIMENTS

The present invention will be further clarified based on the following figures and embodiments.

Embodiment 1

Figure 1:
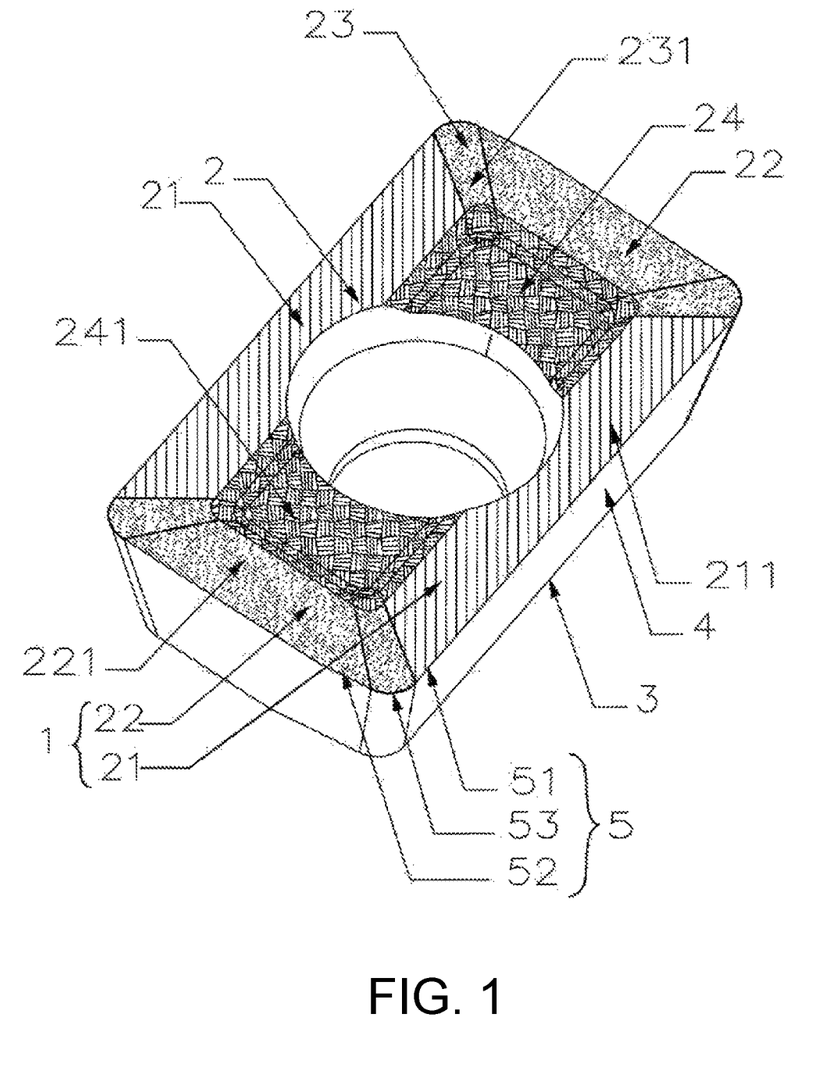
FIG. 1 illustrates a stereostructure of Embodiment 1 of the present invention.
Figure 2:
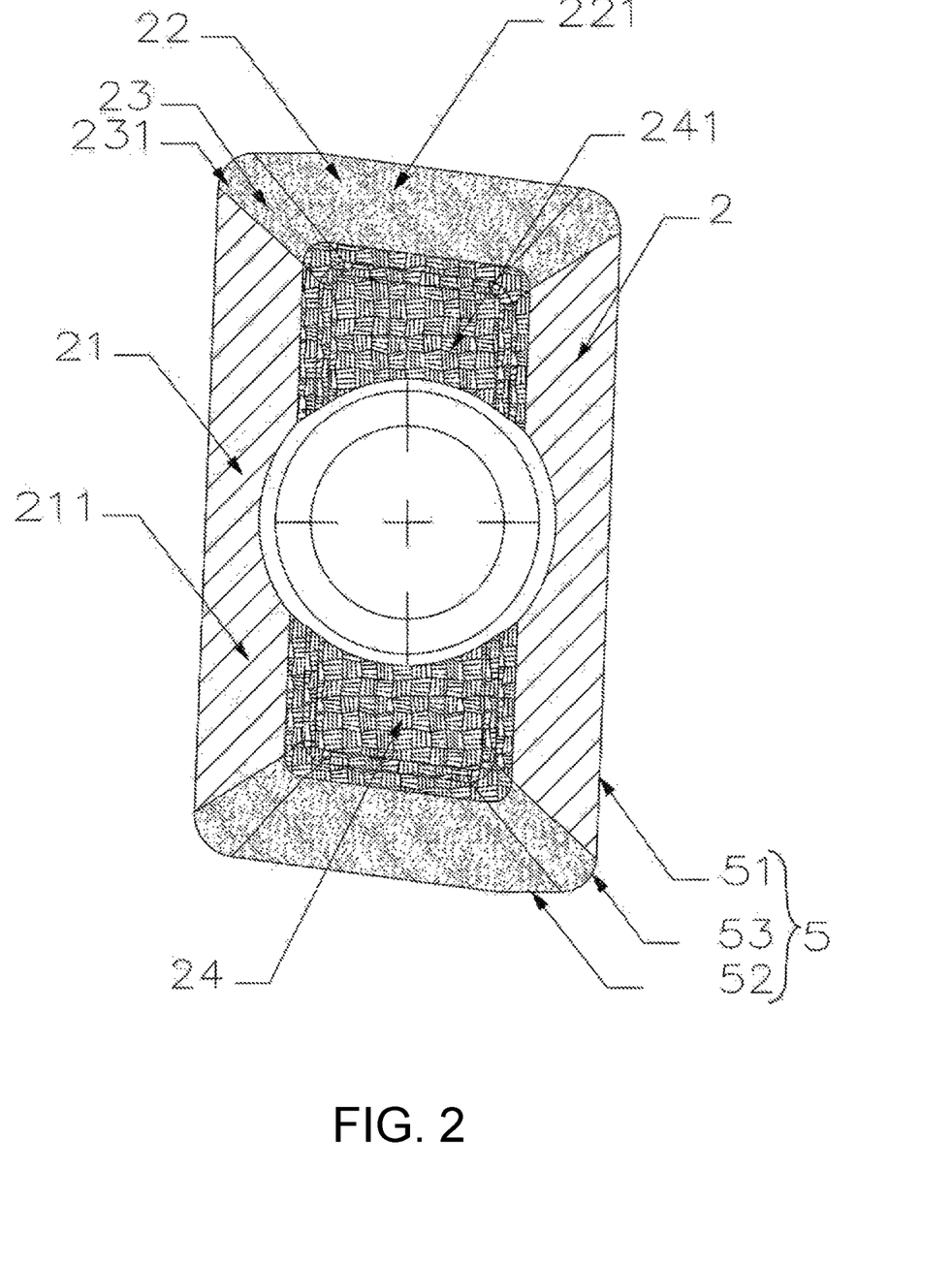
FIG. 2 illustrates a front structural view of Embodiment 1 of the present invention.

As shown in FIGS. 1 and 2, a cutting blade having a plurality of different coatings on surfaces thereof of this embodiment, comprising an upper surface 2, a lower surface 3, and a side surface 4 connecting the upper surface 2 and the lower surface 3; the upper surface 2 intersects the side surface 4 to form at least one cutting edge unit 5, and the cutting edge unit 5 comprises a main cutting edge 51 and a secondary cutting edge 52; the upper surface 2 comprises at least one set of cutting planes 1, and the cutting planes 1 comprise a main cutting surface 21 and a secondary cutting surface 22, the main cutting surface 21 intersects the side surface 4 to form the main cutting edge 51, and the secondary cutting surface 22 intersects the side surface 4 to form the secondary cutting edge 52; the main cutting surface 21 is provided with a main coating 211, and the secondary cutting surface 22 is provided with the secondary coating 221, and the main coating 211 and the secondary coating 221 are independent from each other.

In this embodiment, the main cutting edge 51 in the cutting edge unit 5 is mainly used for milling in a main feeding direction, while the secondary cutting edge 52 is mainly used for milling in a cutting depth direction. Therefore, the cutting edge unit 5 can be used for plane milling or step milling. The main cutting edge 51 is mainly used for main milling with high cutting force at the side surface, while the secondary cutting edge 52 is mainly used for processed surface finishing and face milling. Due to application of a one-time molding process to a substrate of the cutting blade, as well as substantially completely identical intensities and wear resistance of all parts of the blade, single surface coating can be only applied to further improving intensities, impact resistance or wear resistance of the main cutting edge 51 and the secondary cutting edge 52, but cannot respectively enhance different cutting capacities of the main cutting edge 51 and the secondary cutting edge 52 in a targeted manner, for instance, improvement on the intensity and wear resistance of the main cutting edge 51 and the wear resistance of the secondary cutting edge 52.

For the purpose of improving the cutting efficiency of the main cutting edge 51 according to the present invention, the main cutting edge 51 is required to have good intensity and impact resistance, and a coating (equivalent to the main coating 211) is applied to the corresponding main cutting surface 21 of the main cutting edge 51 to improve the cutting performance of the main cutting edge 51. In an attempt to ensure the quality of the processed surface, the secondary cutting edge 52 is required to have a good wear resistance, and a coating (equivalent to the secondary coating 221) is applied to the corresponding secondary cutting surface 22 of the secondary cutting edge 52 to improve the cutting performance of the secondary cutting edge 52. Meanwhile, different coatings can be selected for the main cutting surface 21 and the secondary cutting surface 22 to allow the service life of the main cutting edge 51 and the secondary cutting edge 52 to be consistent after their respective cutting performance requirements are satisfied, so as to avoid, for instance, failure of the entire cutting unit caused by damage of parts of cutting edges in single cutting unit of the ordinary cutting blade, improve the cutting efficiency of the cutting blade, the quality of the processed surface and the continuous processing capability, and make the service life of the main cutting edge 51 close to the one of the secondary cutting edge 52 in single cutting edge unit 5, thereby greatly improving the service life of the cutting blade to a great extent and reducing the blade replacement rate.

In this embodiment, an angular cutting surface 23 is provided between the main cutting surface 21 and the secondary cutting surface 22, the angular cutting surface 23 intersects the side surface 4 to form an angular cutting edge 53, the main cutting edge 51 smoothly connects the secondary cutting edge 52 through the angular cutting edge 53, and a cutting edge unit 5 is constituted by the main cutting edge 51, the secondary cutting edge 52 and the angular cutting edge 53. The main cutting edge 51 and the secondary cutting edge 52 are arranged alternatively. The angular cutting edge 53 is used for assisting in cutting. According to the performance of the angular cutting surface 23, the corresponding coating is applied to same, equivalent to having the angular coating 231, so that the service life of the angular cutting edge 53 matches the service life of the main cutting edge 51 and the secondary cutting edge 52, thus improving the overall service life of the blade.

In this embodiment, the main coating 231 is the same as the secondary coating 221. The main coating 211 is a TiAlN coating, and the secondary coating 221 is an $Al_2O_3$ coating.

In this embodiment, the upper surface 2 comprises two sets of cutting planes 1, the main cutting surface 21 in each set of cutting planes 1 has the main coating 211, the secondary cutting surface 22 has the secondary coating 221, and one cutting edge unit 5 is provided between the main cutting surface 21 and the secondary cutting surface 22 in each set of cutting planes 1; two cutting edge units 5 are formed in total. Two cutting edge units 5 are arranged diagonally, namely, the cutting blade is capable of milling twice. In other words, the blade is rotated 180° after one cutting edge unit 5 is milled, and then the other cutting edge unit 5 can be used for continuously milling.

In this embodiment, the upper surface 2 further comprises an upper middle surface 24, and the upper middle surface 24 has an upper middle coating 241. The upper middle surface 24 is not used for cutting, but cuttings produced by the cutting edge unit 5 inevitably wear and scratch the upper middle surface 24, and the upper middle surface 24 is coated for protection.

Embodiment 2

Figure 3:
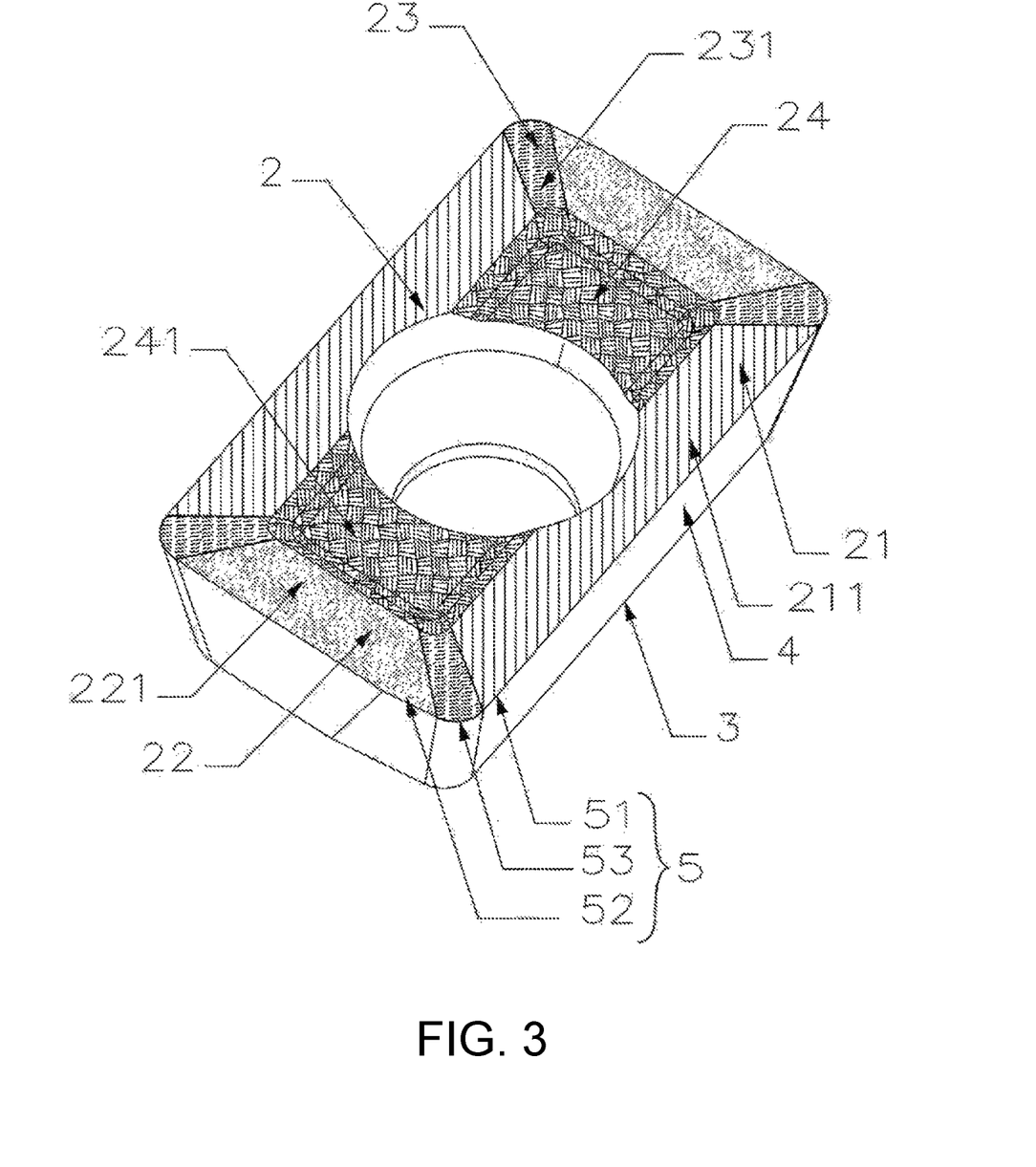
FIG. 3 illustrates a stereostructure of Embodiment 2 of the present invention.

As shown in FIG. 3, a cutting blade having a plurality of different coatings on surfaces thereof in this embodiment is essentially identical to Embodiment 1, but the difference therebetween lies in that the angular coating 231 differs from the main coating 211 and the secondary coating 221.

Embodiment 3

Figure 4:
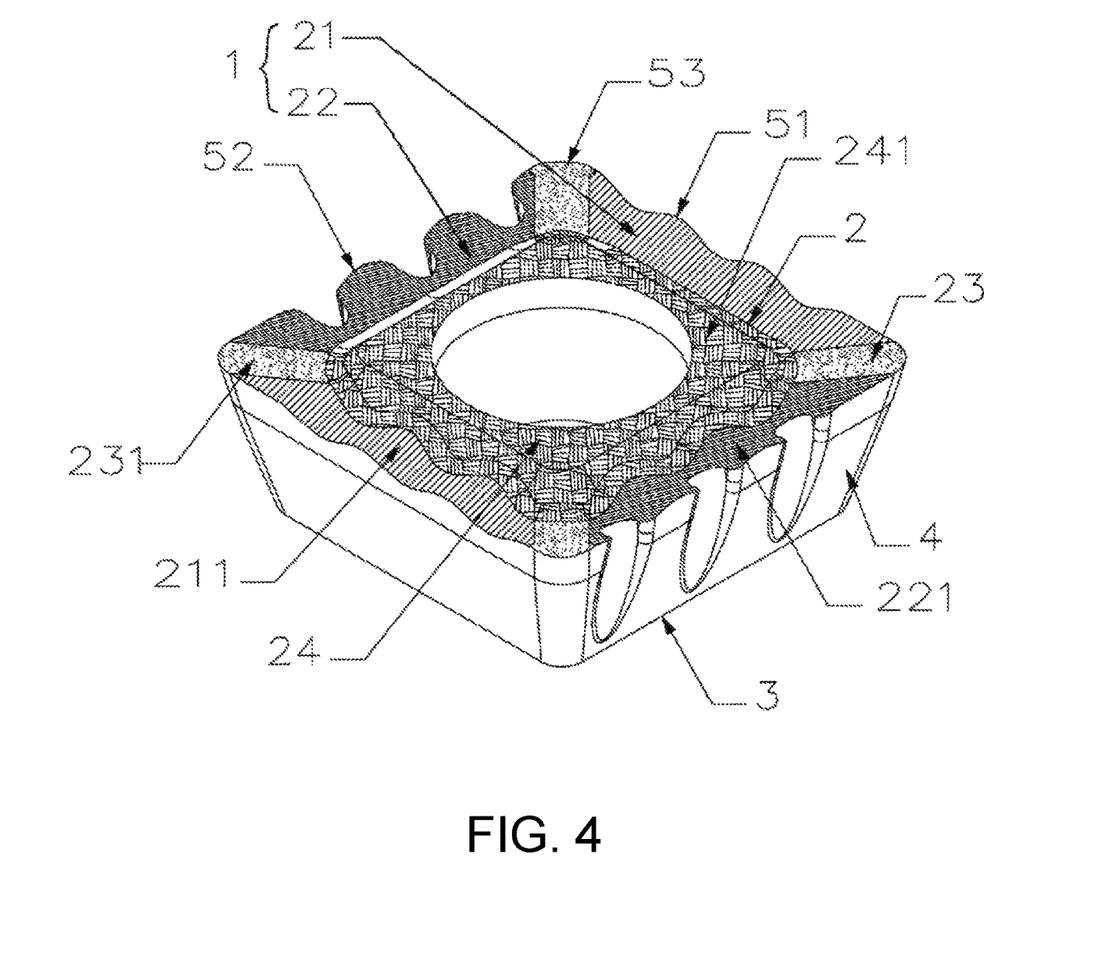
FIG. 4 illustrates a stereostructure of Embodiment 3 of the present invention.
Figure 5:
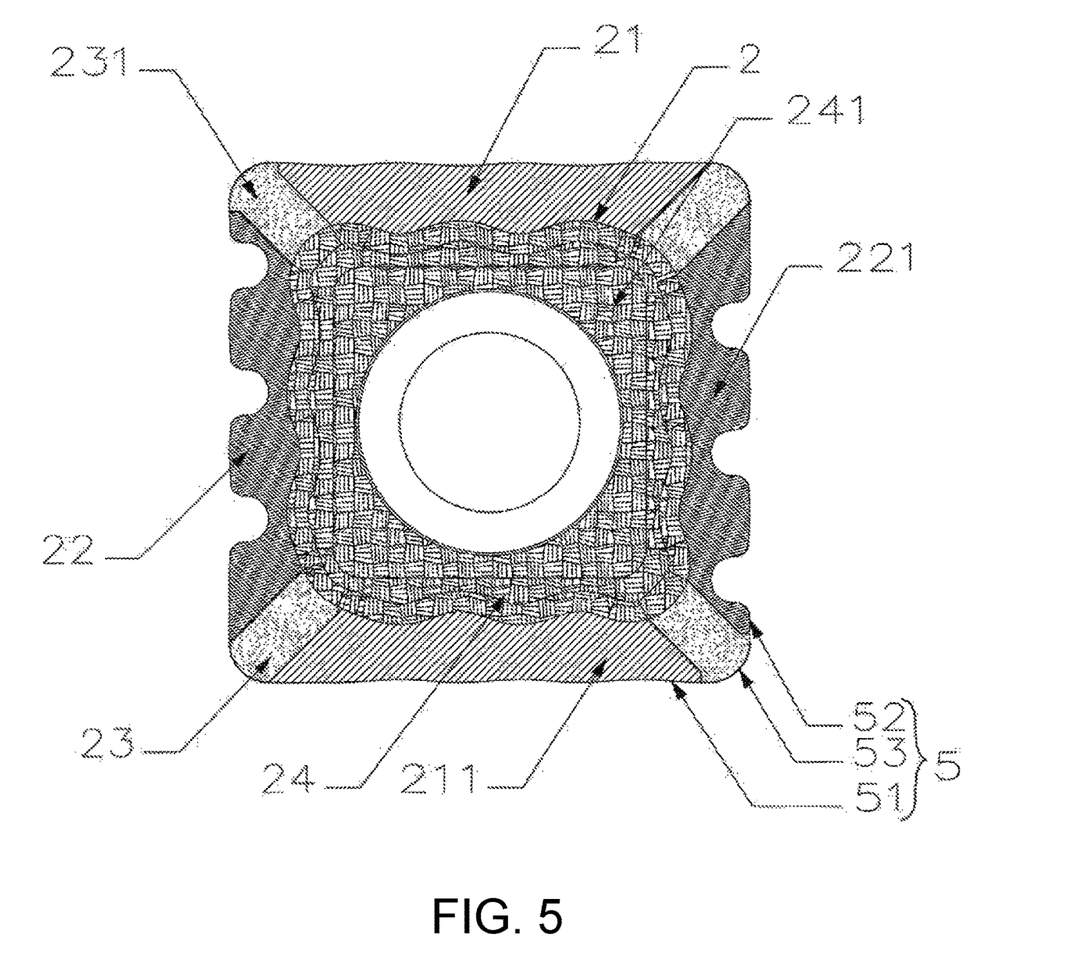
FIG. 5 illustrates a front structural view of Embodiment 3 of the present invention.

As shown in FIGS. 4 and 5, according to a cutting blade having a plurality of different coatings on surfaces thereof in this embodiment, this embodiment is approximately the same as Embodiment 1, and the differences therebetween lie in that:

In this embodiment, the upper surface 2 comprises two sets of cutting planes 1, the main cutting surface 21 in each set of cutting planes 1 has the main coating 211, the secondary cutting surface 22 has the secondary coating 221, and one cutting edge unit 5 is provided between the main cutting surface 21 and the secondary cutting surface 22 in each set of cutting planes 1; the cutting edge unit 5 is provided between the main cutting surface 21 in one set of cutting planes 1 and the secondary cutting surface 22 in the other set of cutting planes 1; four cutting edge units 5 are formed in total. The main cutting edge 51 is a continuous cutting edge, and the secondary cutting edge 52 is an intermittent cutting edge.

In this embodiment, among the four cutting edge units 5, the two cutting edge units 5 arranged diagonally are identical in structure, and one diagonal cutting edge unit 5 differs from the other diagonal cutting edge unit 5. The main cutting edge 51 in one cutting edge unit 5 is used for cutting in a feeding direction, while the secondary cutting edge 52 is used for cutting in a deep cut direction; the secondary cutting edge 52 in the other cutting edge unit 5 is used for cutting in the feeding direction, while the main cutting edge 51 is used for cutting in the deep cut direction. As shown in FIG. 5, the main cutting edge 51 is used for cutting in the feeding direction, while the secondary cutting edge 52 is used for cutting in the deep cut direction. After the blade is rotated 90° in an anticlockwise direction, the secondary cutting edge 52 is used for cutting in the feeding direction, while the main cutting edge 51 is used for cutting in the deep cut direction.

In this embodiment, the main cutting edge 51 is the continuous cutting edge, and the secondary cutting edge 52 is the intermittent cutting edge. When the cutting blade is arranged on a cutting tool for use, the main cutting edge 51 and the secondary cutting edge 52 are alternatively applied to main cutting in a side surface feeding direction, through which the cutting efficiency and the cutting removal capability of the side surface feeding direction can be improved. At the time of main cutting in the side surface feeding direction of the main cutting edge 51, the continuous cutting edge will produce cuttings with big widths and different thicknesses, so that the main cutting edge 51 is required to have a good intensity; in the course of main cutting in the side surface feeding direction of the secondary cutting edge 52, the continuous cutting edge will produce cuttings with small widths and equal thicknesses, so that the secondary cutting edge 52 is required to have a good impact resistance. Due to application of a one-time molding process to a substrate of the cutting blade, as well as substantially completely identical intensities and wear resistance of all parts of the blade, single surface coating can be only applied to further improving intensities, impact resistance or wear resistance of the main cutting edge 51 and the secondary cutting edge 52, but cannot respectively enhance different cutting capacities of the main cutting edge 51 and the secondary cutting edge 52 in a targeted manner, for instance, improvement on the intensity and wear resistance of the main cutting edge 51 and the wear resistance of the secondary cutting edge 52.

For the purpose of improving the cutting efficiency of the cutting blade according to the present invention, the coating (equivalent to the main coating 211) is applied to the corresponding main cutting surface 21 of the main cutting edge 51 to improve the cutting performance of the main cutting edge 51. In an attempt to ensure the quality of the processed surface, the secondary cutting edge 52 is required to have a good wear resistance, and the coating (equivalent to the secondary coating 221) is applied to the corresponding secondary cutting surface 22 of the secondary cutting edge 52 to improve the impact resistance and cutting performance of the secondary cutting edge 52. Meanwhile, different coatings can be selected for the main cutting surface 21 and the secondary cutting surface 22, and the main coating 211 and the secondary coating 221 are independent from each other to satisfy their respective cutting performances such that the service life of the main cutting edge 51 and the secondary cutting edge 52 are consistent, thereby greatly improving the service life of the cutting blade to a greater extent.

In this embodiment, the main coating 211 is a TiN coating, and the secondary coating 221 is a TiAlN coating. Due to the fact that the angular cutting surface 23 is located between the main cutting surface 21 and the secondary cutting surface 22, but the cutting conditions thereof are not completely identical to those of the main cutting surface 21 and the secondary cutting surface 22, in order to make the cutting performance and service life of the angular cutting surface 23 close to those of the main cutting surface 21 and the secondary cutting surface 22, in this embodiment, the angular cutting surface 23 is provided with the angular coating 231 different from the main coating 211 and the secondary coating 221.

In this embodiment, similarly, a center of an upper surface 2 is provided with an upper middle surface 24, and the upper middle surface 24 is provided with an upper middle coating 241.

In addition to the above embodiments, in order to further improve the cutting performance of the angular cutting surface 23 and to further simplify the structure, the angular coating 231 can be designed to consist of the main coating 211 and the secondary coating 221, or the angular coating 231 is designed to be identical to the secondary coating 221.

In the above embodiments, the cutting blade has two or four cutting units, but the present invention is not limited this. In addition to the above embodiments, the cutting blade can be also designed to have three or a plurality of cutting units to optimize the cutting performance.

In the above embodiments, due to the fact that the side surface 4 of the cutting blade has a rear angle, the upper surface 2 is only used for cutting, but the present invention is not limited to this. In addition to the above embodiments, for the sake of increasing the quantity of the cutting edge units 5 of the cutting blade, the upper surface 2 and the lower surface 3 of the cutting blade have the same geometric structure and coating structure, namely, the cutting blade is a double cutting blade.

In the above embodiments, the cutting blade is mainly applied in a milling direction, but the present invention is not limited to this. In addition to the above embodiments, the cutting blade can also be designed as a turning or drilling blade based on different cutting conditions.

While the preferred embodiments of the present invention have been disclosed as above, they are not intended to limit the present invention. Any person skilled in the art, without departing from the scope of the technical solution of the present invention, can take advantage of the above-described technical content to make many possible variations and modifications of the present invention, or equivalent embodiments with equivalent change. Therefore, all the contents without departing from the technical solution of the present invention, based on any simple modification, equivalent variations and modifications of the present invention made by the technical essence of the present invention for the above embodiment, would fall within the protection scope of the technical solution of the present invention.

What is claimed is:

1. A cutting blade having a plurality of different coatings on surfaces of the cutting blade, comprising an upper surface, a lower surface, and a side surface connecting the upper surface and the lower surface; wherein the upper surface intersects the side surface to form at least one cutting edge unit; the cutting edge unit comprises a main cutting edge and a secondary cutting edge; the upper surface comprises at least one set of cutting planes; the cutting planes comprise a main cutting surface and a secondary cutting surface; the main cutting surface intersects the side surface to form the main cutting edge; the secondary cutting surface intersects the side surface to form the secondary cutting edge; a main coating is provided on the main cutting surface; a secondary coating is provided on the secondary cutting surface; and the main coating and the secondary coating are different from each other, wherein the upper surface comprises two sets of the cutting planes; the main cutting surface in each set of the cutting planes has the main coating; the secondary cutting surface in each set of the cutting planes has the secondary coating; one cutting edge unit is provided between the main cutting surface and the secondary cutting surface in each set of the cutting planes; and two cutting edge units are formed in total.

2. The cutting blade having a plurality of different coatings on surfaces of the cutting blade according to claim 1, wherein an angular cutting surface is provided between the main cutting surface and the secondary cutting surface; the angular cutting surface intersects the side surface to form an angular cutting edge; the main cutting edge smoothly connects the secondary cutting edge through the angular cutting edge; and a cutting edge unit is constituted by the main cutting edge, the secondary cutting edge and the angular cutting edge.

3. The cutting blade having a plurality of different coatings on surfaces of the cutting blade according to claim 2, wherein the angular cutting surface has an angular coating; and the angular coating is the same as the main coating, or the angular coating is the same as the secondary coating, or the angular coating consists of the main coating and the secondary coating, or the angular coating differs from both the main coating and the secondary coating.

4. The cutting blade having a plurality of different coatings on surfaces of the cutting blade according to claim 1, wherein the main coating is a TiAlN coating; and the secondary coating is an $Al_2O_3$ coating.

5. The cutting blade having a plurality of different coatings on surfaces of the cutting blade according to claim 1, wherein the upper surface further comprises an upper middle surface, and the upper middle surface has an upper middle coating.

6. The cutting blade having a plurality of different coatings on surfaces of the cutting blade according to claim 1, wherein the lower surface and the upper surface are identical in structure.

7. A cutting blade having a plurality of different coatings on surfaces of the cutting blade, comprising an upper surface, a lower surface, and a side surface connecting the upper surface and the lower surface; wherein the upper surface intersects the side surface to form at least one cutting edge unit; the cutting edge unit comprises a main cutting edge and a secondary cutting edge; the upper surface comprises at least one set of cutting planes; the cutting planes comprise a main cutting surface and a secondary cutting surface; the main cutting surface intersects the side surface to form the main cutting edge; the secondary cutting surface intersects the side surface to form the secondary cutting edge; a main coating is provided on the main cutting surface; a secondary coating is provided on the secondary cutting surface; and the main coating and the secondary coating are different from each other, wherein the main coating is a TiAlN coating; and the secondary coating is an $Al_2O_3$ coating.

8. The cutting blade having a plurality of different coatings on surfaces of the cutting blade according to claim 7, wherein an angular cutting surface is provided between the main cutting surface and the secondary cutting surface; the angular cutting surface intersects the side surface to form an angular cutting edge; the main cutting edge smoothly connects the secondary cutting edge through the angular cutting edge; and a cutting edge unit is constituted by the main cutting edge, the secondary cutting edge and the angular cutting edge.

9. The cutting blade having a plurality of different coatings on surfaces of the cutting blade according to claim 8, wherein the angular cutting surface has an angular coating; and the angular coating is the same as the main coating, or the angular coating is the same as the secondary coating, or the angular coating consists of the main coating and the secondary coating, or the angular coating differs from both the main coating and the secondary coating.

10. The cutting blade having a plurality of different coatings on surfaces of the cutting blade according to claim 7, wherein the upper surface comprises two sets of the cutting planes; the main cutting surface in each set of the cutting planes has the main coating; the secondary cutting surface in each set of the cutting planes has the secondary coating; one cutting edge unit is provided between the main cutting surface and the secondary cutting surface in each set of the cutting planes; and two cutting edge units are formed in total.

11. The cutting blade having a plurality of different coatings on surfaces of the cutting blade according to claim 7, wherein the upper surface comprises two sets of the cutting planes; the main cutting surface in each set of the cutting planes has the main coating; the secondary cutting surface in each set of the cutting planes has the secondary coating; one cutting edge unit is provided between the main cutting surface and the secondary cutting surface in each set of the cutting planes; in both sets of the cutting planes, one cutting edge unit is provided between the main cutting surface in one set of the cutting planes and the secondary cutting surface in the other set of the cutting planes; and four cutting edge units are formed in total.

12. The cutting blade having a plurality of different coatings on surfaces of the cutting blade according to claim 11, wherein the main cutting edge is a continuous cutting edge, and the secondary cutting edge is an intermittent cutting edge.

13. The cutting blade having a plurality of different coatings on surfaces of the cutting blade according to claim 7, wherein the upper surface further comprises an upper middle surface, and the upper middle surface has an upper middle coating.

14. The cutting blade having a plurality of different coatings on surfaces of the cutting blade according to claim 7, wherein the lower surface and the upper surface are identical in structure.

15. A cutting blade having a plurality of different coatings on surfaces of the cutting blade, comprising an upper surface, a lower surface, and a side surface connecting the upper surface and the lower surface; wherein the upper surface intersects the side surface to form at least one cutting edge unit; the cutting edge unit comprises a main cutting edge and a secondary cutting edge; the upper surface comprises at least one set of cutting planes; the cutting planes comprise a main cutting surface and a secondary cutting surface; the main cutting surface intersects the side surface to form the main cutting edge; the secondary cutting surface intersects the side surface to form the secondary cutting edge; a main coating is provided on the main cutting surface; a secondary coating is provided on the secondary cutting surface; and the main coating and the secondary coating are different from each other, wherein the upper surface comprises two sets of the cutting planes; the main cutting surface in each set of the cutting planes has the main coating; the secondary cutting surface in each set of the cutting planes has the secondary coating; one cutting edge unit is provided between the main cutting surface and the secondary cutting surface in each set of the cutting planes; in both sets of the cutting planes, one cutting edge unit is provided between the main cutting surface in one set of the cutting planes and the secondary cutting surface in the other set of the cutting planes; wherein the four cutting edge units are formed in total, the main cutting edge is a continuous cutting edge, and the secondary cutting edge is an intermittent cutting edge.

16. The cutting blade having a plurality of different coatings on surfaces of the cutting blade according to claim 15, wherein an angular cutting surface is provided between the main cutting surface and the secondary cutting surface; the angular cutting surface intersects the side surface to form an angular cutting edge; the main cutting edge smoothly connects the secondary cutting edge through the angular cutting edge; and a cutting edge unit is constituted by the main cutting edge, the secondary cutting edge and the angular cutting edge.

17. The cutting blade having a plurality of different coatings on surfaces of the cutting blade according to claim 16, wherein the angular cutting surface has an angular coating; and the angular coating is the same as the main coating, or the angular coating is the same as the secondary coating, or the angular coating consists of the main coating and the secondary coating, or the angular coating differs from both the main coating and the secondary coating.

18. The cutting blade having a plurality of different coatings on surfaces of the cutting blade according to claim 15, wherein the main coating is a TiAlN coating; and the secondary coating is an $Al_2O_3$ coating.

19. The cutting blade having a plurality of different coatings on surfaces of the cutting blade according to claim 15, wherein the upper surface further comprises an upper middle surface, and the upper middle surface has an upper middle coating.

20. The cutting blade having a plurality of different coatings on surfaces of the cutting blade according to claim 15, wherein the lower surface and the upper surface are identical in structure.

* * * * *